United States Patent
Zimmer et al.

(10) Patent No.: US 8,268,436 B2
(45) Date of Patent: Sep. 18, 2012

(54) TIRE WITH INDICIA CONTAINING COMPOSITE MAGNETIC NANOPARTICLES

(75) Inventors: Rene Jean Zimmer, Howald (LU); Claude Ernest Felix Boes, Erpeldange (LU); Georges Koster, Steinfort (LU); Hans-Bernd Fuchs, Konz (DE); Klaus Unseld, Luxembourg (LU); Wolfgang Albert Lauer, Mersch (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 806 days.

(21) Appl. No.: 12/327,216

(22) Filed: Dec. 3, 2008

(65) Prior Publication Data

US 2009/0155551 A1 Jun. 18, 2009

Related U.S. Application Data

(60) Provisional application No. 61/014,026, filed on Dec. 15, 2007.

(51) Int. Cl.
*B32B 3/10* (2006.01)

(52) U.S. Cl. ......... 428/195.1; 428/201; 428/206; 428/325; 428/404; 428/432; 428/692.1; 152/450

(58) Field of Classification Search ........ 428/195.1, 428/201, 206, 325, 404, 432, 692.1; 152/450
See application file for complete search history.

(56) References Cited

U.S. PATENT DOCUMENTS

| | | | |
|---|---|---|---|
| 3,233,647 A | 6/1963 | Newell | 152/330 |
| 3,225,810 A | 12/1965 | Enabnit | 152/330 |
| 3,249,658 A | 5/1966 | Hodges et al. | 264/25 |
| 3,750,120 A | 7/1973 | McCarty | 340/174 |
| 4,240,487 A * | 12/1980 | Lal et al. | 152/525 |
| 4,329,265 A | 5/1982 | Hallenbeck | 524/496 |
| 6,357,501 B1 | 3/2002 | Becherer et al. | 152/450 |
| 6,476,110 B1 | 11/2002 | Papp et al. | 524/262 |
| 6,500,896 B1 | 12/2002 | Rajaraman | 524/552 |
| 6,548,264 B1 | 4/2003 | Tan et al. | 435/7.21 |
| 6,746,767 B2 | 6/2004 | Gottfried et al. | 428/402 |
| 6,924,033 B2 | 8/2005 | Pryor et al. | 428/404 |
| 7,232,498 B2 | 6/2007 | Zimmer et al. | 156/116 |
| 7,255,762 B2 | 8/2007 | Zanzig et al. | 156/116 |
| 7,294,376 B2 | 11/2007 | Zanzig | 428/36.8 |
| 2004/0020575 A1* | 2/2004 | Zanzig et al. | 152/151 |
| 2004/0210289 A1* | 10/2004 | Wang et al. | 607/116 |
| 2005/0049356 A1* | 3/2005 | Zanzig | 524/544 |
| 2006/0094818 A1* | 5/2006 | Weidinger | 524/588 |
| 2006/0191617 A1 | 8/2006 | Byrne | 152/524 |

FOREIGN PATENT DOCUMENTS

| | | |
|---|---|---|
| EP | 1 284 485 A1 | 2/2003 |
| EP | 1 512 523 A1 | 3/2005 |
| WO | WO2006/024413 | 3/2006 |

OTHER PUBLICATIONS

European Search Report completed Apr. 16, 2009.

* cited by examiner

*Primary Examiner* — Gerard Higgins
*Assistant Examiner* — Sathavaram I Reddy
(74) *Attorney, Agent, or Firm* — John D. DeLong

(57) ABSTRACT

The present invention is directed to a pneumatic tire comprising one or more indicia formed from an elastomeric coating composition comprising a diene based elastomer and from 1 to 100 parts by weight, per 100 parts by weight of elastomer, of a nanoparticle comprising an inner core of an inorganic magnetic material at least partially covered by an outer layer of silica.

13 Claims, 1 Drawing Sheet

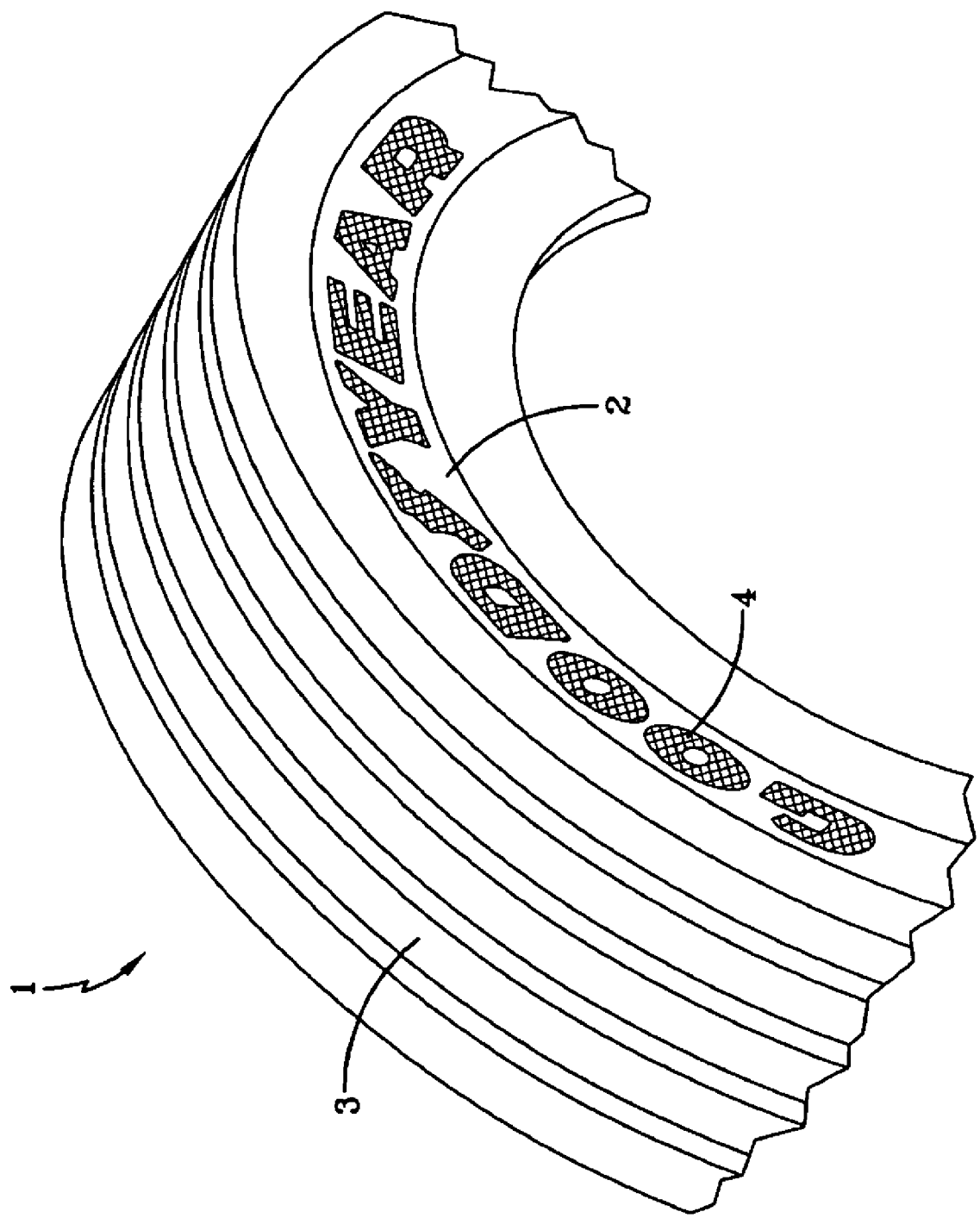

TIRE WITH INDICIA CONTAINING COMPOSITE MAGNETIC NANOPARTICLES

CROSS REFERENCE TO OTHER APPLICATIONS

This application claims the benefit of Ser. No. 61/014,026 filed Dec. 15, 2007.

BACKGROUND OF THE INVENTION

Pneumatic tires often desirably have indicial markings, such as trademarks or other markings. These indicia typically are formed directly into the rubber sidewall during the tire molding process. Thus, the indicia may be raised lettering or other shapes, and may be colored with white pigments or other colorants in the rubber compound.

It is sometimes desired to apply indicia directly to an already molded and cured tire, typically on the sidewall area. To do this, various coatings and paints have been used to form indicia. However, poor adhesion or durability of the coatings usually leads to unacceptable performance of this type of indicia.

It would, therefore, be desirable to have a tire with indicia applied to a cured tire sidewall surface, wherein the indicial coating material offers good adhesion and durability.

SUMMARY OF THE INVENTION

The present invention provides a pneumatic tire, wherein the tire comprises one or more indicia formed from an elastomeric coating composition comprising a diene based elastomer and from 1 to 100 parts by weight, per 100 parts by weight of elastomer, of a nanoparticle comprising an inner core of an inorganic magnetic material at least partially covered by an outer layer of silica.

BRIEF DESCRIPTION OF THE DRAWING

The drawing shows one embodiment of a tire according to the present invention.

DETAILED DESCRIPTION OF THE INVENTION

There is disclosed a pneumatic tire, wherein the tire comprises one or more indicia formed from an elastomeric coating composition comprising a diene based elastomer and from 1 to 100 parts by weight, per 100 parts by weight of elastomer, of a nanoparticle comprising an inner core of an inorganic magnetic material at least partially covered by an outer layer of silica.

The elastomeric composition includes a nanoparticle comprising an inner core of an inorganic magnetic material at least partially covered by an outer layer of silica. In one embodiment, the inorganic magnetic material is magnetite ($Fe_3O_4$) or maghemite ($\gamma$-$Fe_2O_3$). In one embodiment, suitable nanoparticle comprising an inner core of an inorganic magnetic material at least partially covered by an outer layer of silica is produced by methods as taught for example in U.S. Pat. Nos. 6,548,264; 6,924,033; or 6,746,767; the teachings of all of which are fully incorporated herein by reference.

Suitable nanoparticles comprising an inner core of an inorganic magnetic material at least partially covered by an outer layer of silica are available commercially as MagSilica® from Degussa.

As disclosed in U.S. Pat. Nos. 6,548,264; 6,924,033; or 6,746,767, suitable nanoparticles may be produced by a variety of methods. Some of these methods as in U.S. Pat. Nos. 6,548,264 or 6,924,033 involve the formation of an aqueous slurry of dispersed core particles having the desired magnetic properties and deposition of a siliceous coating onto the surface of the core particles wherein the slurry pH at the end of the deposition is about 9 or less. Alternatively, as in U.S. Pat. No. 6,746,767 a vapor or aerosol mixture of the precursors to the magnetic and siliceous materials may be processed pyrogenically to form the particles.

In one embodiment, the nanoparticle comprising an inner core of an inorganic magnetic material at least partially covered by an outer layer of silica has a particle size ranging from 3 to 100 nm. In one embodiment, the nanoparticle comprising an inner core of an inorganic magnetic material at least partially covered by an outer layer of silica has a particle size ranging from 10 to 60 nm.

In one embodiment, the nanoparticle comprising an inner core of an inorganic magnetic material at least partially covered by an outer layer of silica is present in the rubber composition in a concentration ranging from 1 to 100 parts by weight per 100 parts by weight of diene based elastomer (phr). In another embodiment, the nanoparticle comprising an inner core of an inorganic magnetic material at least partially covered by an outer layer of silica is present in the rubber composition in a concentration ranging from 5 to 50 parts by weight per 100 parts by weight of diene based elastomer (phr). In another embodiment, the nanoparticle comprising an inner core of an inorganic magnetic material at least partially covered by an outer layer of silica is present in the rubber composition in a concentration ranging from 10 to 30 parts by weight per 100 parts by weight of diene based elastomer (phr).

The elastomeric coating composition may be used with rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1, 4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may include from about 10 to about 150 phr of silica, in addition to the nanoparticle comprising an inner core of an inorganic magnetic material at least partially covered by an outer layer of silica.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. Examples of suitable sulfur containing organosilicon compounds are of the formula:

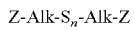

Z-Alk-S$_n$-Alk-Z      III in which Z is selected from the group consisting of

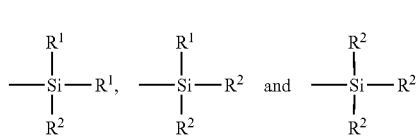

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula III, Z may be

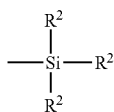

where $R^2$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)—S—CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

The sulfur containing organosilicon compound may be added directed to the elastomeric coating composition, or may be pre-reacted with the silica surface of the nanoparticle comprising an inner core of an inorganic magnetic material at least partially covered by an outer layer of silica, as described for example in WO2006/024413.

It is readily understood by those having skill in the art that the rubber composition would be compounded by methods generally known in the rubber compounding art, such as mixing the various constituent rubbers with various commonly used additive materials such as, for example, sulfur, sulfur donors, peroxides, curing aids, such as accelerators, activators and retarders and processing additives, such as oils, resins including tackifying resins and plasticizers, fillers, pigments, fatty acid, zinc oxide, waxes, antioxidants and antiozonants and peptizing agents. As known to those skilled in the art the additives mentioned above are selected and commonly used in conventional amounts.

The water-based or solvent-based elastomeric coating composition liquid used to form the indicia may comprise one or more colorants as are desired to impart a given color to the indicia on the tire. The color imparted by the colorants is not limited, and may include any color obtainable with known colorant additives. The colorants may include any suitable dyes, pigments, or the like that impart the desired color. The colorants may be included in the water or solvent-based coating liquid, or mixed with the coating liquid immediately prior to application to the tire. The relative amount of colorant to be added to the coating liquid is dependent on the type of colorant, the desired color, and the desired intensity of the color, as would be appreciated by one of skill in the art without undue experimentation.

Dyes are generally defined as compounds which contain groups that confer color, generally called chromophores. More information on dyes in general is available in The Chemistry of Synthetic Dyes, Volumes I and II by K. Venkaktaraman, 1952, published by Academic Press, Inc., New York, and in Organic Chemistry by W. T. Caldwell, 1943, published by Houghton Mifflin Company in its chapter entitled "Synthetic Dyes," Pages 702 through 725.

The elastomeric coating composition used to form the indicia also may contain color pigments, including inorganic pigments, such as titanium dioxide, talc, mica, iron oxides, lead oxides, chromium oxides, lead chromate and carbon black, including conductive carbon black, and organic pigments such as phthalocyanine blue and phthalocyanine green, as well as a variety of other color pigments.

The elastomeric coating composition will be prepared suitably for application as an indicial marking on an exterior surface of the tire. The elastomeric coating composition applied to the tire external surfaces may be in any form that will adequately adhere to the tire surface and suitably resist peeling, cracking, and sloughing from the tire. In one embodiment, the elastomeric coating composition is applied as liquid solution of at least one elastomer in a water or solvent-based carrier.

In one alternative embodiment, the coating may be applied as a water-based elastomer liquid. The elastomer and nanoparticles comprising an inner core of an inorganic magnetic material at least partially covered by an outer layer of silica may be dispersed as finely divided particles in the water-based carrier as an emulsion or latex comprising various suitable additives including surfactants, preservatives, and colorants. Other additives may be included in the water-based elastomer liquid as are known in the art. The water-based elastomer may be used as a one part coating application or as part of a two-part application. In one embodiment, the water-based composition may be used as a one-part coating wherein suitable curing agents are included to promote crosslinking or otherwise cure the elastomer coating. In another embodiment, the water-based elastomer may be used a part of a two part application, wherein suitable curing agents are contained separate from the water-based elastomer, and mixed with the water-based elastomer immediately prior to application on the tire external surface.

In another embodiment, the elastomeric coating composition may be applied as a solvent-based liquid. The elastomer may be partially or completely dissolved or swelled in a suitable organic solvent, with the nanoparticles comprising an inner core of an inorganic magnetic material at least partially covered by an outer layer of silica suitably dispersed therein. Suitable solvents include but are not limited to various organic solvents as are known in the art such as cyclohexane, hexane, heptane, octane, decane, dodecane, methylene chloride, chloroform, and the like; and various aromatic solvents such as toluene and the like; halogenated aromatics, various Tolusols generally containing C7 hydrocarbons and significant amounts of aromatic compounds therein, xylene, dichlorobenzene, and the like; diphenyl ether, and the like; ketones including acetone, methyl ethyl ketone, methyl isobutyl ketone, and the like; and alkyl esters such as ethyl acetate, methyl acetate and the like. Solvents may be used singly or as a mixture of one or more solvents. The solvent-based elastomeric coating composition liquid may be used as a one part coating application or as part of a two-part application. In one embodiment, the solvent-based elastomer may be used as a one-part coating wherein suitable curing agents are included to promote crosslinking or otherwise cure the elastomer coating. In another embodiment, the solvent-based elastomeric coating composition may be used as part of a two part application, wherein suitable curing agents are contained separate from the solvent-based elastomer, and mixed with the solvent-based elastomer immediately prior to application on the tire external surface.

After any preliminary surface preparation and priming, the water-based or solvent-based coating material may be applied to the one or more external tire surfaces by one of the aforementioned methods. In one embodiment, the coating material containing suitable colorant and curing agents is sprayed onto at least part of all entire external surfaces of the tire. The coating solution is applied in a manner sufficient to give a coating over part or all of the external surface of the tire, where the thickness of the coating when cured is suitable to prevent cracking, peeling, and sloughing from the tire surface. In one embodiment, the thickness of the indicia ranges from 1 to 10 microns. In another embodiment, the thickness of the indicia ranges from 1 to 5 microns. In another embodiment, the thickness of the indicia ranges from 1 to 2 microns.

The water-based or solvent-based coating liquid used to form the indicia is applied to one or more external surfaces of a tire by any of various application methods as are known in the art, including spraying, brushing, rolling, submersion, and dipping, wiping, tampon printing, and the like. In one embodiment, the water-based or solvent-based coating liquid is sprayed onto one or more external surfaces of the tire, with templates used to define the indicia. The spray is applied manually or automatically using spray application devices as are known in the art. In another embodiment, the liquid is applied from a roller with precut indicial markings on the roller, and the liquid transferred from the precut markings to the tire surface. Alternatively, the elastomeric coating composition is sprayed onto the external surface of the tire from one or more inkjet nozzles, as described in U.S. Pat. No. 7,232,498. In another embodiment, the elastomeric coating composition is applied using tampon printing methods, for example as described in U.S. Pat. No. 6,619,203.

After application of the elastomeric coating composition to an exterior surface of a tire, the composition may be cured by application of electromagnetic radiation such a radio frequency or microwave radiation, with the magnetic cores of the nanoparticles comprising an inner core of an inorganic magnetic material at least partially covered by an outer layer of silica enhancing the susceptibility of the coating to heating. In one embodiment, the coating may be exposed to an electromagnetic field in such a way as to heat the coating due to interaction of the magnetic particles with the electromagnetic field. In this way, the coating may be heated and cured selectively without application of heat to the entire tire. Such devices as are known in the electromagnetic device art may be used to this end.

The drawing shows a tire (1) with a sidewall portion (2) and tread portion (3). In the sidewall portion (2), yellow letters and wingfoot logo (4) are formed by application of the elastomeric coating composition in the form of a liquid subsequent to vulcanization of the tire. The yellow letters and wingfoot logo (4) are of an elastomeric composition as described herein.

The elastomer coating composition will generally resist cracking, peeling, and flaking from the surface of the tire. To aid in protection of the indicia from external effects such as abrasion and flexure, the raised indicia may include various protective features. In one embodiment, the indicia may be disposed in a recessed cavity in the sidewall, in the manner described in U.S. Pat. No. 7,232,498. Alternatively, the indicia may be disposed on the main sidewall surface, with protective rubber scuff ribs disposed around the periphery of the raised indicia. Such scuff ribs may be molded along with the tire sidewall during the tire molding process, as is known in the art.

The pneumatic tire having indicia may have the elastomeric coating composition applied as indicia to the tire external surface in any desirable shape, such as lettering, trademark figures or logos, and the like. The indicia may also be in the shape or pattern of a sidewall stripe or stripes, such as for a white sidewall. Also envisioned as indicia are decorative markings, such as flowers, dots, short parallel and/or angled stripes or hash marks, or any other shapes as are desired by the user of the tire.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire comprising one or more indicia formed from an elastomeric coating composition comprising a diene based elastomer and from 1 to 100 parts by weight, per 100 parts by weight of elastomer (phr), of nanoparticles comprising an inner core of an inorganic magnetic material at least partially covered by an outer layer of silica.

2. The pneumatic tire of claim 1, wherein the nanoparticles comprising an inner core of an inorganic magnetic material at least partially covered by an outer layer of silica are present in an amount ranging from 5 to 50 phr.

3. The pneumatic tire of claim 1, wherein the nanoparticles comprising an inner core of an inorganic magnetic material at least partially covered by an outer layer of silica are present in an amount ranging from 10 to 30 phr.

4. The pneumatic tire of claim 1, wherein the inorganic magnetic material is selected from the group consisting of magnetite and maghemite.

5. The pneumatic tire of claim 1, wherein the nanoparticles comprising an inner core of an inorganic magnetic material at least partially covered by an outer layer of silica have a particle size ranging from 3 to 100 nm.

6. The pneumatic tire of claim 1, wherein the nanoparticles comprising an inner core of an inorganic magnetic material at least partially covered by an outer layer of silica have a particle size ranging from 10 to 60 nm.

7. The pneumatic tire of claim 1, wherein the elastomer is selected from the group consisting of natural rubber, synthetic polyisoprene, polybutadiene and styrene-butadiene rubber.

8. The pneumatic tire of claim 1, wherein the indicia have a thickness ranging from 1 to 10 microns.

9. The pneumatic tire of claim 1, wherein the indicia have a thickness ranging from 1 to 5 microns.

10. The pneumatic tire of claim 1, wherein the indicia have a thickness ranging from 1 to 2 microns.

11. The pneumatic tire of claim 1, wherein the elastomeric composition further comprises one or more colorants.

12. The pneumatic tire of claim 1, wherein the indicia are electromagnetically cured.

13. The pneumatic tire of claim 1, wherein the indicia are selected from the group consisting of lettering, trademark figures, logos, sidewall stripes, flowers, dots, short parallel and/or angled stripes and hash marks.

* * * * *